(12) United States Patent
Schwarzer et al.

(10) Patent No.: US 8,203,553 B2
(45) Date of Patent: Jun. 19, 2012

(54) DISTRIBUTED CALCULATION OF IMAGES OF VOLUMETRIC OBJECTS

(75) Inventors: Jesko Schwarzer, Bonn (DE); Klaus Engel, Donauwörth (DE); Alexander Ehlert, Wernau (DE); Frederik Lange, Erlangen (DE)

(73) Assignee: Siemens Aktiegesellschaft, Munich (DE)

( * ) Notice: Subject to any disclaimer, the term of this patent is extended or adjusted under 35 U.S.C. 154(b) by 1078 days.

(21) Appl. No.: 12/105,767

(22) Filed: Apr. 18, 2008

(65) Prior Publication Data

US 2008/0297508 A1    Dec. 4, 2008

(30) Foreign Application Priority Data

Apr. 27, 2007   (DE) .......................... 10 2007 020 060

(51) Int. Cl.
*G06T 15/00*    (2011.01)
(52) U.S. Cl. ......... 345/419; 345/420; 345/423; 345/424
(58) Field of Classification Search ........... 345/419–427
See application file for complete search history.

(56) References Cited

U.S. PATENT DOCUMENTS

| 6,664,961 | B2 * | 12/2003 | Ray et al. ....................... 345/424 |
| 6,674,430 | B1 * | 1/2004 | Kaufman et al. ............. 345/419 |
| 7,031,517 | B1 | 4/2006 | Le et al. |
| 7,301,538 | B2 * | 11/2007 | Buyanovskiy ................ 345/426 |
| 7,333,107 | B2 * | 2/2008 | Papageorgiou ............... 345/424 |
| 2002/0048401 | A1 | 4/2002 | Boykov |
| 2006/0239553 | A1 | 10/2006 | Florin et al. |

OTHER PUBLICATIONS

Ma et al., A Data Distributed, Parallel Algorithm for Ray-Traced Volume Rendering, PRS '93 Proceedings of the 1993 Symposium on Parallel Rendering, ACM, 1993, pp. 15-23.*
Muller et al., Optimized Volume Raycasting for Graphics-Hardware-based Cluster Systems, Eurographics Symposium on Parallel Graphics and Visualization, The Eurographics Association, May 2006.*
German Office Action dated Apr. 14, 2008 with English translation.
M. Linkenheil, "Graph-Cut Segmentation for Medical Imaging," German Cancer Research Center, Heildelberg, Aug. 2005, pp. i-iv, 1-85; eHB.

* cited by examiner

*Primary Examiner* — Xiao M. Wu
*Assistant Examiner* — Charles Tseng
(74) *Attorney, Agent, or Firm* — Lempia Summerfield Katz LLC

(57) ABSTRACT

A method for calculating an image in the context of a volume visualization by ray casting using a plurality of computing nodes is provided. The method includes subdividing a volume that is to be visualized into subvolumes assigned to the plurality of computing nodes; assigning a subdivision of data to volume points and storing the subdivision of data in a memory associated with the plurality of computing nodes, the subdivision corresponding to the assignment of subvolumes to nodes; and computing at least one pixel by generating a ray leading through the volume, wherein computing includes taking into account points lying on the ray one after another.

9 Claims, 4 Drawing Sheets

Data stored on FPGA 15 is assigned to 5

13 is assigned to 3

Sample Configuration

Patch distribution is done on SubVolume boundaries in main direction

| RayStart | x,y,z |
|---|---|
| RayDirection | x,y,z |
| RayColor | r,g,b |
| RayOpacity | α |
| RayPrevVoxelColor | Value |
| RayState | Started, Valid |

DISTRIBUTED CALCULATION OF IMAGES OF VOLUMETRIC OBJECTS

This application claims the benefit of DE 10 2007 020 060.0 filed Apr. 27, 2007, which is hereby incorporated by reference.

BACKGROUND

The present embodiments relate to calculating an image in the context of a volume visualization by ray casting using a plurality of computing nodes.

Volume rendering relates to the representation or visualization of three-dimensional bodies or objects. The modeling, reconstruction or visualization of three-dimensional objects is used in the fields of medicine (e.g. CT, PET), physics (e.g. electron structure of large molecules) or geophysics (characteristics and location of earth layers). The object to be examined is irradiated (e.g. by electromagnetic waves or sound waves) in order to investigate its properties. The scattered radiation is detected and characteristics of the body are determined from the detected values. The determined result generally represents a physical variable (e.g. density, tissue type, elasticity, speed) whose value is determined for the body. To determine the value of the physical variable, a virtual grid may be used. The value of the variable is determined at the grid points of the virtual grid. These grid points are generally referred to as voxels. The term "voxel" is a portmanteau formed from the terms "volume" and "pixel." A voxel corresponds to the space coordinate of a grid point to which the value of a variable is assigned at this location. The value is a physical variable that can be represented as a scalar or vector field. The space coordinate is assigned the corresponding field value. The value of the variable or field at arbitrary object points (i.e. at any location points of the examined object) may be obtained by interpolating the voxels.

By using volume rendering, a three-dimensional visualization (representation) of the examined object or body is generated from the voxels on a two-dimensional display surface (e.g. screen). The "pixels" are generated by the volume rendering from the voxels (frequently with the intermediate stage of object points obtained from the voxels by interpolation). The image of the two-dimensional image display is composed of the pixels. To visualize three dimensions on a two-dimensional display, an alpha compositing (or alpha decomposition) may be applied. With this standard method, voxels or volume points formed from voxels are assigned both color values and transparency values (usually designated by the term "opacity," which expresses the permeability or, as the case may be, coverage effect of different layers of the body). An object point may be assigned a color value in the form of a three-tuple, which encodes the percentages of the colors red, green and blue (called the RGB value), and an alpha value, which parameterizes the opacity.

An illumination model may be used to assign a suitable color value. The illumination model takes into account light effects (usually reflections of the light on surfaces of the object including the outer surface or surfaces of inner layers of the examined object) in a modeled or simulated irradiation of the object for the purposes of visualization.

A series of illumination models may be used, for example, the Phong, Gouraud or Schlick model. To use the models, an angle between the incident light and the surface normal of the reflecting surface may be required. For this purpose the gradient and from it the normal vector for the voxels or object points is determined for the models.

One method for volume rendering is referred to as ray casting or the simulation of a light irradiation for the purpose of representing or visualizing the body. Elements of a ray casting visualization technique are described below. With ray-casting or ray tracing, as it also called for volume visualization, imaginary rays that radiate from the eye of the viewer are sent through the examined body or the examined object. Along the rays, object points are calculated from the voxels and combined to form a two-dimensional image by compositing. The following two procedures are carried out. The procedures can be performed separately from each other or in combination with each other.

Classification: Opacity values or alpha values are assigned to the values along the rays.

Shading: Color values are assigned to the individual points with the aid of an illumination model.

Object points on a ray are determined for the ray in (typically) equidistant steps (intervals). Classification and shading are performed for each object point. The result for color value and opacity value for the calculated object point is iteratively combined with the already calculated values. Color value and opacity value are present for the traversed or calculated ray section, with which values the color value and opacity value for the currently calculated object point are combined for the purpose of a volume visualization (the term "compositing" is often used). The result for the color value after the ray has passed through is then yielded by a pixel. The totality of pixels that were generated by the generation of rays is composed into a two-dimensional image area on which a three-dimensional representation of the examined body may be seen.

Owing to the high number of voxels required for a sharp representation of the examined object or body, the computing overhead is considerable. There is the requirement to perform the calculations as quickly as possible in order to allow the viewer the possibility of the change in perspective (associated with a recalculation of the image) when viewing the visualized object. For the purpose of a fast calculation it is usual to distribute the computing load over a plurality of computing units (computing nodes, processors).

SUMMARY & DESCRIPTION

The present embodiments may obviate one or more of the limitations or drawbacks inherent in the related art. For example, one embodiment may improve the distributed calculation of images in the course of ray casting.

The calculations required in the course of ray casting are performed by a plurality of nodes, to each of which memory is assigned. These nodes are, for example, processors, but they may also be any other types of computing units that are suitable for handling subtasks during calculation in the course of ray casting. The memory may be provided in the form of cache memory, for example. The individual nodes may have an assigned memory area that can be accessed more quickly than non-assigned memory. For example, in what are termed non-uniform memory architectures (NUMAs), which counteract the bottleneck of memory access times by more efficient memory access by a processor to its own, locally allocated memory. Memory assigned to a node may be referred to as a local memory (for that node). Non-assigned memory may be referred to as non-local memory. A memory area may be local memory for more than one node.

Ray casting may be used to visualize an object or volume. Information describing the volume (voxels) is processed and then represented in the form of a two-dimensional image. The information includes, for example, grayscale values generated in the course of a CT scan that are assigned to volume points. The information or data characterizing the volume that is to be examined is stored in the memories assigned to the nodes (e.g., local memory). The volume may be subdivided into partial volumes or "subvolumes." Each subvolume is assigned a node and its local memory, where the data associated with the subvolume (e.g. voxels lying in the subvolume) is stored.

In one embodiment, the calculation of the image, by the plurality of nodes, is performed with regard to the computation method or the calculation sequence specified by the ray casting. Ray casting entails simulating rays which penetrate the examined volume. Calculations are performed act by act along these rays, such that at the end, a pixel results for each ray. The calculation of a pixel is performed act by act by generating a ray that is cast through the volume to be examined, the individual acts being performed by a node that is suitable for performing the calculation act (process). The suitability of a node for performing a calculation act is determined in this case from the data required for this act. The assignment of the task of performing the calculation act to a node may be made dependent, for example, on all, some, or parts of the data required for this calculation act being stored locally on the node. For example, the assignment of the task of performing the calculation act to a node may be made dependent on as large a part as possible of the data required for this calculation act being stored locally on the node. For data not locally present, which is required for the calculation act, the node then has recourse (access) to data stored on other nodes. Generally, only one ray section will lie in the assigned subvolume. After the partial section has been processed, a node assigned to an adjacent subvolume may be more suitable for performing the further ray-related calculations. Another node may take over the calculations required for the ray, depending on a criterion. The criterion may be directed at the suitability of a node for the simultaneous calculation of a bundle or a plurality of rays. Aspects of the load distribution may be used as a further criterion for the subdivision of the calculation, for example, in the course of avoiding an overload.

The calculation of a point by a ray is performed continuously by act-by-act processing of the ray. Subsequent adjustment of partial results, which is associated with ray sections, may not be needed. It is also favorable that as a result of this ray-related calculation the currently calculated values can be used for optimizing the calculation; thus, it is possible in particular to terminate the calculation of the point by way of a ray when the residual ray provides no further contribution to the pixel (this is the case if the ray has penetrated so far in the volume that the volume has become nontransparent for the ray).

In the calculation of a point by a ray it is useful if, when changing the node that is responsible, ray-related data is transmitted from the node relinquishing responsibility to the newly responsible node so that the calculation can be continued seamlessly.

In one embodiment, the calculation of a plurality of adjacent pixels (partial area or partial surface of the image to be calculated) is handled collectively. For example, a processing node may perform collective processing or assignment. The term "patch" may be used to describe this partial surface. The node initially responsible for the patch may be specified by projecting the patch onto the volume to be visualized and determining the subvolume with which the patch has the greatest intersecting plane. The node assigned to the subvolume may be charged with the processing of the ray bundle given by the patch. As a result of the processing of the patch, the patch moves (wanders), as it were, through the volume. An assignment to a different node and calculation by said node can now be made based on the position of the patch within the volume. Possible criteria for a node change are then that in the case of a new step another node encompasses more rays of the patch than the previously responsible node, or that the patch has completely left the volume that is assigned to the processing nodes.

In one embodiment, a computing system includes a plurality of nodes that carry out a method for calculating an image in the context of a volume visualization, for example, by ray casting. Corresponding software programming is possible. With a view to achieving an increase in speed, the computational acts necessary for the ray casting are also implemented at the present time by hardware solutions that are based on FPGAs (field programmable gate arrays). The nodes of the computing system may form, for example, a NUMA architecture.

DETAILED DESCRIPTION

Figure 1:
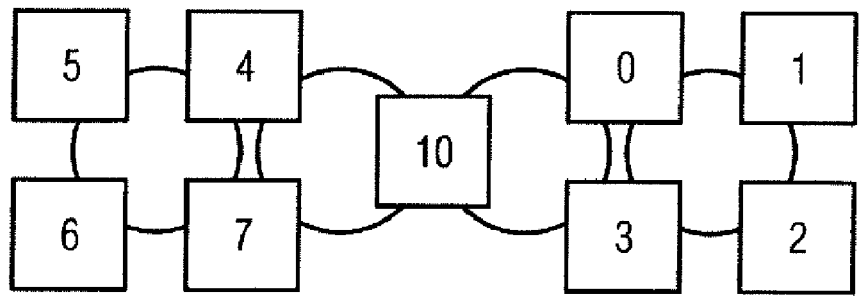
FIG. 1 illustrates one embodiment of a computing system including nodes.

FIG. 1 shows a system including nodes. FIG. 1 shows eight nodes 0 to 7, which form two groups of four nodes (0 to 3 and 4 to 7). The two groups of four nodes are interconnected via a broadband network 10. The nodes form a Non-Uniform Memory Architecture (NUMA) having local and non-local memory for the individual nodes. The system may be a multiprocessor system with a memory. The memory access time is dependent on the position of the memory relative to the processor or the node. For example, in a NUMA, a processor may access its own local memory faster than a non-local memory. Local and non-local memory may be available for the processors or nodes. However, access to a local memory may be quicker than access to non-local memory.

Figure 2:
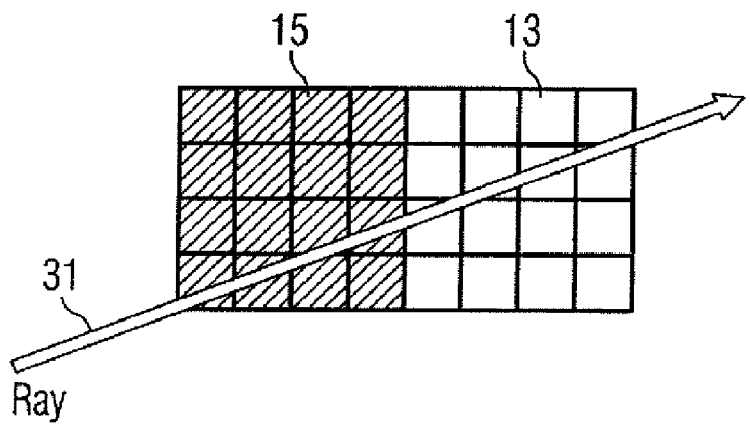
FIG. 2 illustrates propagation of a ray through two subvolumes.
Figure 2:
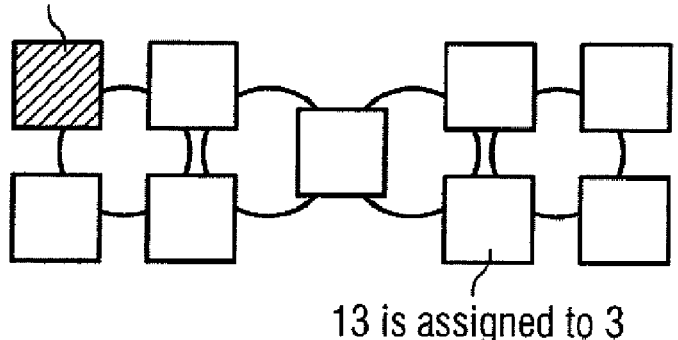

The volume to be represented may be subdivided into subvolumes, the individual subvolumes including a plurality of grid points for which grayscale values of the volume are present. Two subvolumes 15, 13 are shown in FIG. 2. Subvolumes 15, 13 are overlaid by a grid. The intersection points of the grid correspond to voxels encompassed by the respective subvolume. Grayscale values are present for these coordinates. During ray casting, as shown by the arrow 31 in FIG. 2, a ray is cast through the volume. Along the ray (31), the grayscale values are determined by interpolation in equidistant intervals and processed for composition into a pixel. Classification and shading may be performed. The subvolumes are each allocated a processing node that stores the corresponding grayscale values of the subvolume in its local memory. The two subvolumes 15, 13 may have processing nodes 5 and 3 (as shown in FIG. 2). For example, the processing node 5 may be assigned to subvolume 15 and processing node 3 may be assigned to subvolume 13.

Figure 3:
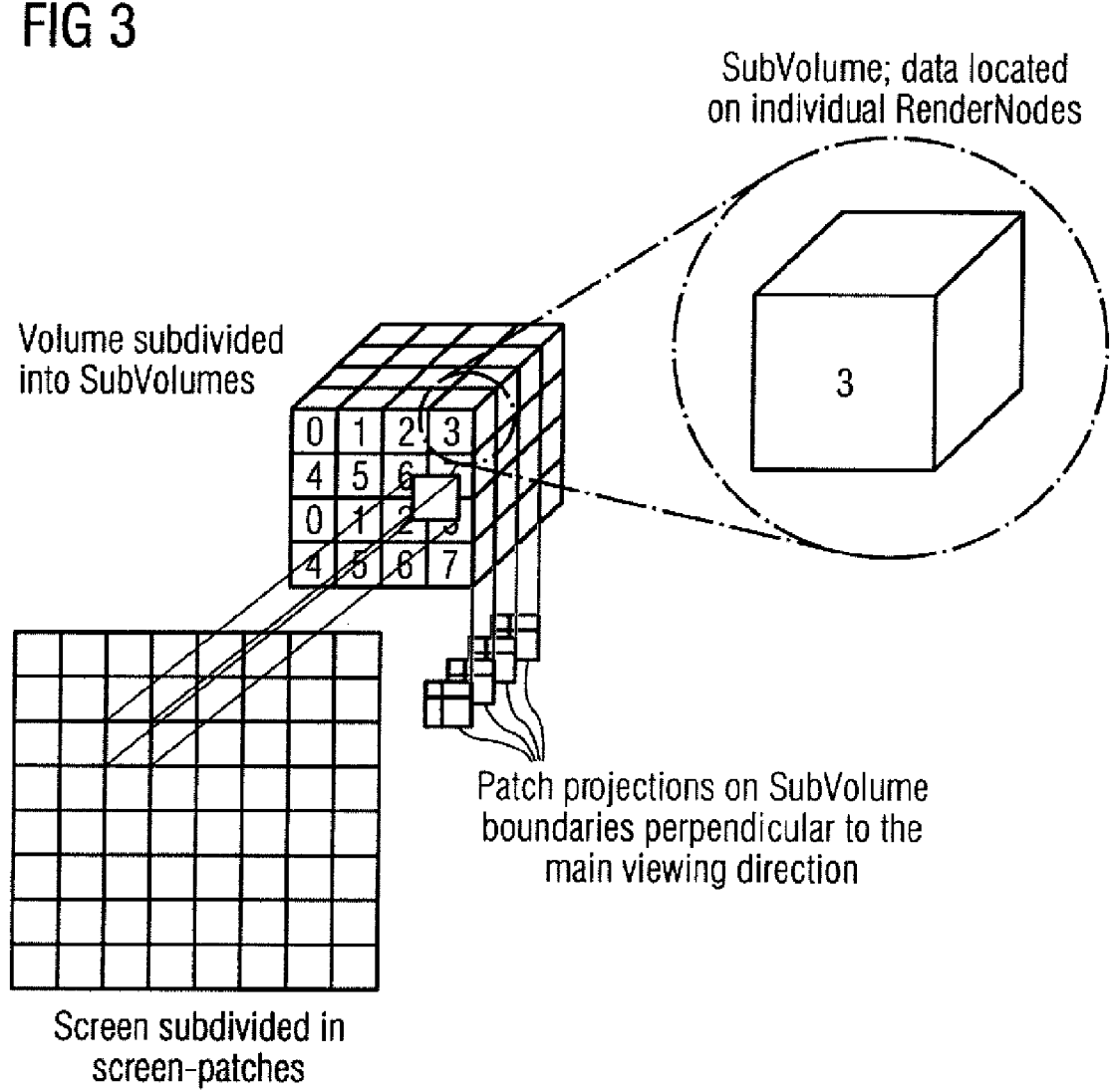
FIG. 3 illustrates one embodiment of a subdivision of the image area into patches and projection of a patch onto the volume to be visualized.

As illustrated in FIG. 3, a group of rays or corresponding pixels are combined for handling. An image area 11 may be subdivided into partial surfaces or patches. For example, a patch may include 16×16 pixels or rays. A patch may be projected onto a volume that is to be visualized. The volume is subdivided into subvolumes, each of which is assigned to a node or to the local memory of a node. The assignment is expressed by the numerals on these subvolumes. For example, node 3 is the front subvolume at top right. The patch is projected onto the volume perpendicularly relative to the main component of the viewing direction or propagation direction of the rays. Shown underneath the volume are the projections of the patch onto subvolumes constituting the volume for the different layers of the volume. The projections may lie on subvolume boundaries. An associated subvolume or an associated node in accordance with a criterion is specified or determined.

Figure 4:
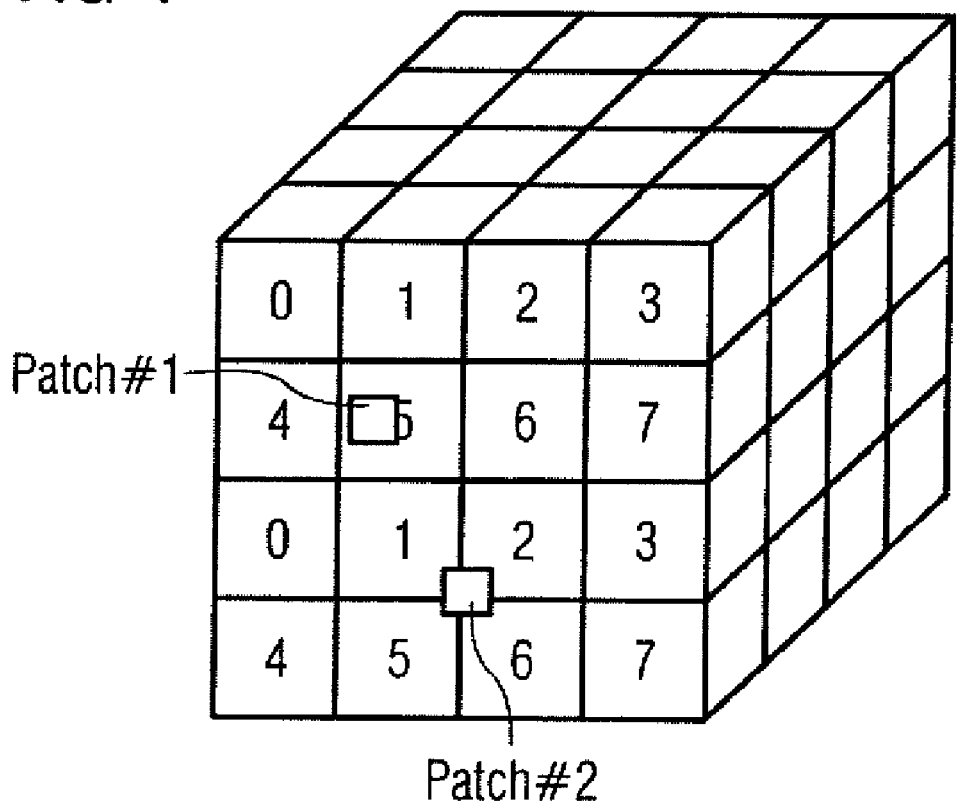
FIG. 4 illustrates a subdivided volume onto which two patches are projected.
Figure 5:
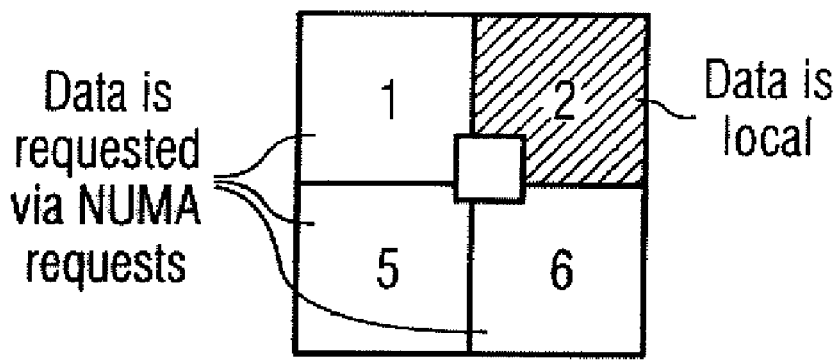
FIG. 5 illustrates one embodiment of a procedure for handling a patch that cannot be handled entirely locally.

FIG. 4 illustrates the projection of two patches. The first patch (Patch #1) lies completely on a subvolume, which is assigned to the node 5. The processing of the first patch (Patch #1) is allocated to the node 5. The first patch may be allocated to node 5 for at least as long as the first patch moves within the first layer. In contrast, the second patch (Patch #2) lies on the border area of four subvolumes that are assigned to the nodes 1, 2, 5 and 6. A criteria for specifying the node responsible is, for example, the size of the surface area of the projection on the corresponding subvolume. A major portion of the patch may lie on the subvolume, which is assigned to the node 2. As shown in FIG. 5, node 2 is defined for the calculation, whereby not only local memory, but also memory assigned to the nodes 1, 5 or 6 is accessed in the course of the calculation. The data of the subvolume assigned to the node 2 is local. Accordingly, the memory access is correspondingly fast, whereas access to the data which is assigned to the other three subvolumes (with assignment to the nodes 1, 5 and 6) is implemented by a NUMA request.

Figures 6, 7:
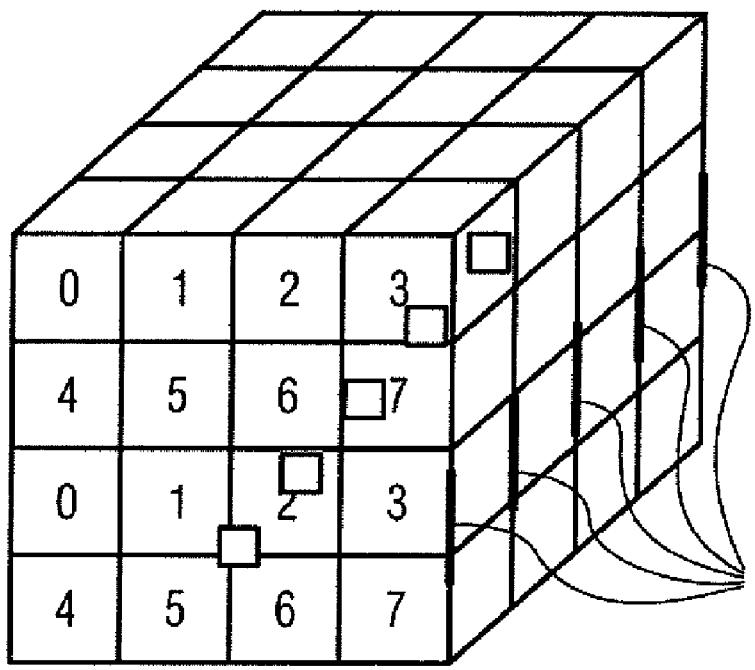
FIG. 6 illustrates propagation of a patch through a volume.
FIG. 7 illustrates a table containing values transmitted between nodes for the purpose of continuing the calculation.

FIG. 6 shows how the projected patch progresses or is propagated through the volume in the course of the processing of the individual intervals (e.g., steps) during the calculation of the pixels along the rays. The projection leaves the area of subvolumes and advances to other subvolumes. The subvolumes change completely at the boundaries of the layers, formed by the subvolumes, which run parallel to the patch (in this case four layers). A criteria may be defined such that a reassignment of the patch is to be performed in a new calculation. The criteria may be, for example, that the patch has completely left the area of the subvolume of the responsible node, which may occur at the boundaries of the layers. An alternative criteria may be defined such that in each case that subvolume (or the node associated with the subvolume) is assigned that encompasses the most rays of the patch. The criteria takes into account changes within a layer.

The responsibility of the nodes changes based on the calculation of the patch or the corresponding pixels. In order to perform a seamless calculation along the rays encompassed by the patch, a communication between nodes during the transfer of responsibility is provided so that the calculation can be continued seamlessly. The volume of the transmitted information is limited as far as possible in order to minimize the additional demands on resources resulting therefrom. Examples of ray-related information is shown in FIG. 7, which simultaneously describes the format of the transmitted data packets. The following information may transferred: the starting point of a ray (RayStart) and its direction (RayDirection), the current color values of the ray in the last processing step (RayColor) and the current transparency value (RayOpacity), the last grayscale value (RayPrevVoxelColor) and state information relating to the ray (RayState). Other information may be transmitted, such as increment information with which the color value calculation is performed along the ray. The increment information is included in the length of the direction (RayDirection).

The exemplary embodiment shows only one embodiment. Other embodiments may be derived from the description and figures.

The invention claimed is:

1. A method for calculating an image in the context of a volume visualization by ray casting using a plurality of computing nodes, the method including:
    subdividing a volume that is to be visualized into subvolumes assigned to the plurality of computing nodes;
    assigning a subdivision of data to volume points and storing the subdivision of data in a memory associated with the plurality of computing nodes, the subdivision corresponding to the assignment of the subvolumes to the plurality of computing nodes;
    computing at least one pixel by generating a ray leading through the volume,
    wherein computing includes taking into account points lying on the ray one after another, a first node is specified for a first calculation in accordance with data required for the first calculation and an at least partial storage of the data in the memory associated with the first node, and a second node is specified for a second calculation in accordance with data required for the second calculation and an at least partial storage of the data in the memory associated with the second node,
    wherein one computing node of the plurality of computing nodes calculates pixels encompassed by a patch of the image collectively,
    wherein the patch is assigned to one computing node of the plurality of computing nodes in accordance with a projection of the patch onto the volume according to rays for the calculation of the encompassed pixels, and
    wherein an image area is assigned to a node based on a size of the projection of the patch onto a subvolume of the subvolumes associated with the node;
    changing the assignment to a node based on a progression of the projection of the patch according to the inclusion of points lying on the rays through the volume; and
    assigning responsibility to a different node based on a criterion for a position of the patch in the volume.

2. The method as claimed in claim 1, wherein the plurality of computing nodes and the memory associated with the plurality of computing nodes form a non-uniform memory architecture.

3. The method as claimed in claim 1, further comprising transmitting ray-related data, during the changing and assigning, from a node relinquishing responsibility to a newly responsible node.

4. The method as claimed in claim 1, wherein the criterion specifies whether no further point of the projection lies in the assigned subvolume or whether another subvolume encompasses a larger part of the projection.

5. The method as claimed in claim 1, comprising:
    using a computing load of the plurality of nodes as a criterion for specifying a node for performing a calculation; and
    storing at least part of the data required for the calculation in a memory associated with the node for performing the calculation.

6. A computing system having a plurality of nodes, the computing system comprising:
  a plurality of computing nodes;
  one or more memories associated with the plurality of computing nodes; and
  a volume that is to be visualized, the volume subdivided into subvolumes that are assigned to the plurality of computing nodes,
  wherein a subdivision of data assigned to volume points is stored on a memory associated with the plurality of computing nodes, the subdivision corresponding to the assignment of the subvolumes to the plurality of computing nodes,
  wherein one computing node of the plurality of computing nodes is operable to calculate at least one pixel by generating a ray leading through the volume,
  wherein points lying on the ray are taken into account one after another,
  wherein a first node is specified for a first calculation in accordance with data required for the first calculation and an at least partial storage of the data in the memory associated with the first node, and a second node is specified for a second calculation in accordance with data required for the second calculation and the at least partial storage of the data in the memory associated with the second node,
  wherein one computing node of the plurality of computing nodes calculates pixels encompassed by a patch of an image collectively,
  wherein the patch is assigned to one computing node of the plurality of computing nodes in accordance with a projection of the patch onto the volume according to the rays for the calculation of the encompassed pixels,
  wherein an image area is assigned to a node based on a size of the projection of the patch onto the subvolume associated with the node, and
  wherein the assignment to a node based on a progression of the projection of the patch is changed according to the inclusion of points lying on the rays through the volume, and responsibility is assigned to a different node based on a criterion for a position of the patch in the volume.

7. The computing system as claimed in claim 6, wherein the plurality of nodes and memories associated with the plurality of nodes form a non-uniform memory architecture.

8. The computing system as claimed in claim 6, wherein the computing system is operable to calculate an image in the context of a volume visualization by ray casting using the plurality of computing nodes.

9. The computing system as claimed in claim 6, wherein the criterion specifies whether no further point of the projection lies in the assigned subvolume or whether another subvolume encompasses a larger part of the projection.

* * * * *